United States Patent [19]
Kamiyama et al.

[11] Patent Number: 5,486,332
[45] Date of Patent: Jan. 23, 1996

[54] METHOD FOR EVERTING A TUBULAR LINER BAG

[75] Inventors: Takao Kamiyama, Hiratsuka; Yasuhiro Yokoshima, Ibaraki, both of Japan

[73] Assignees: Shonan Gosei-jushi Seisakusyo K.K., Kanagawa; Yokoshima & Company, Ibaraki, both of Japan

[21] Appl. No.: 209,139

[22] Filed: Mar. 11, 1994

[30] Foreign Application Priority Data

Mar. 12, 1993 [JP] Japan .................................... 5-052356

[51] Int. Cl.$^6$ .............................. B29C 63/36; B29L 23/22
[52] U.S. Cl. ............................. 264/516; 16/287; 16/294; 264/36; 264/269
[58] Field of Search ............................ 264/36, 269, 573, 264/516; 156/287, 294; 138/97, 98

[56] References Cited

FOREIGN PATENT DOCUMENTS 60-242038 12/1985 Japan .
3-281976 12/1991 Japan .
5-92485 4/1993 Japan .

*Primary Examiner*—Mathieu D. Vargot
*Attorney, Agent, or Firm*—Lowe, Price, Leblanc & Becker

[57] ABSTRACT

A tubular liner bag is everted into a pipe to line the same, by first attaching an air hose end to the uneverted liner bag and then everting the tubular liner bag by water pressure provided into the manhole to the pipe. The head of the tubular liner bag is turned toward the pipe entrance when the head of the liner bag hits the inner wall of the pipe, and the tubular liner bag is everted into the pipe. The eversion is then stopped and the everted tubular liner bag is deformed to a J-shape with its head portion corresponding to the toe of the J-shape. Compressed air at a pressure not substantially greater than the pressure required to force the tubular liner bag to evert then exists in the toe section of the tubular liner bag but does not exist in the long-leg section. The air compressor is used to supply compressed air into the head portion of the tubular liner bag via the air hose to increase the internal pressure in the head portion of the tubular liner to a value substantially greater than a required to force the tubular liner bag to evert.

2 Claims, 5 Drawing Sheets

METHOD FOR EVERTING A TUBULAR LINER BAG

FIELD OF THE INVENTION

The present invention relates to a method for everting a tubular liner bag into a pipe in an attempt to line the pipe by applying the tubular liner bag on the inner wall of the pipe. (The meaning of the term "everting" as used herein shall be explained immediately.)

BACKGROUND OF THE RELATED ART

When an underground pipe, such as pipelines and passageways, becomes defective or too old to perform dependably, the pipe is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) Sho 60-242038.

According to this publication, this method of pipe repair comprises inserting a sufficiently long tubular flexible liner bag into the pipe to be repaired by means of a pressurized fluid, like air and water. The tubular liner bag is made of a flexible resin-absorbent material impregnated with a thermosetting resin, and has the outer surface covered with an impermeable plastic film.

More particularly, according to the publication, the tubular flexible liner bag is closed at one end and open at the other; the tubular flexible liner bag is first flattened, then, the closed end of the tubular liner bag is tied to a control rope; the open end of the tubular liner bag is made to gape wide and hooked (anchored) at the end of the defective or old pipe in a manner such that the wide-opened end of the liner completely and fixedly covers and closes the pipe end; a portion of the liner is pushed into the pipe; then, the pressurized fluid is applied to the said portion of the tubular liner such that the fluid urges the tubular liner to enter the pipe. Since one end of the tubular liner is hooked at the end of the pipe, it remains there while the rest of the flexible liner bag is turned inside out as it proceeds deeper in the pipe, and this manner of insertion is exactly what is meant by the term "everting" as used above and it shall mean so throughout this application document. When the entire length of the tubular liner bag is everted (i.e., turned inside out) into the pipe, the control rope holds the closed end of the tubular liner bag to thereby control the length of the tubular liner in the pipe. Then, the everted tubular liner is pressed against the inner wall of the pipe by the said pressurized fluid, and the tubular flexible liner is hardened as the thermosetting resin impregnated in the liner is heated, which is effected by heating the fluid filling the tubular liner bag by means of a hot steam, etc. It is thus possible to line the inside wall of the defective or old pipe with a rigid liner without digging the ground and disassembling the pipe sections.

Now, in this method of underground pipe repair, the pressurized fluid can be anything, but the most frequently used is pressurized water, then compressed air is the next most frequently used, and on many occasions pressurized water and compressed air are used in combination. However, in each of these cases there were certain advantages and disadvantages; for example, the apparatus installed on the ground to effect everting was complicated and large in size.

Accordingly, in order to overcome such disadvantages, the present applicants had proposed a method which introduced a device by virtue of which it became possible to evert the tubular liner bag easily with a compact apparatus much smaller than the conventional apparatus. This method and the device are described in detail in Japanese Provisional Patent Publication (Kokai 5-42485, and will be described here briefly with reference to FIG. 5.

In FIG. 5, the reference numeral 101 designates a tubular liner bag soaked with thermosetting resin, and two closed air bags 102 and 103 are partially attached to the outer surface (before everting) of the liner bag 101.

According to an embodiment of this method, one end of the tubular liner bag 101 is anchored on a tubular brim 106a of a support frame 106, as shown and turned inside the brim 106a a little; next, into the small pocket caused by this turning, water is charged from a water hose 107, whereby the tubular liner bag 101 is everted and enters partially into a manhole 111, which is a vertical entrance to the pipe 110. When the tubular liner bag 101 hits upon the wall of the pipe 110, the head of the bag 101 is turned to that side of the pipe 10 which is to be lined, and the bag 101 is everted into said side of the pipe 110. Then, the air bags 102, 103, which are flattened at the moment, also get into the pipe 110, and, incidentally, the positions at which the air bags 102, 103 are attached to the tubular liner bag 101 are such that when the air bags 102, 103 get into the pipe 110, the air bag 103 stays in the vicinity of the lower end of the manhole 111 and the air bag 102 stays at a location a little farther from the air bag 103, and furthermore, the air bags 102, 103 are attached to the opposite sides of the flattened uneverted tubular liner bag 101, as shown in FIG. 5; so, as the tubular liner bag 101 proceeds into the pipe 110, the air bags 102, 103 enter the pipe 110 and on this occasion the air bags 102, 103 are sandwiched between an everted portion of the tubular liner bag 101 and an uneverted portion thereof. The supply of water is stopped and the liner bag 101 stops everting.

Thereafter, compressed air is supplied from a compressor, not shown, into the air bags 102, 103 via air hoses 104, 105, respectively, whereupon the air bags 102, 103 inflate inside the everted part of the tubular liner bag 101 which has been inserted in the pipe 110, and as the result, the uneverted part of the tubular liner bag 101 is forced to undulate as it runs and describe a locus in a shape of a fallen letter "S", as seen in FIG. 5. Then the supply of water is ceased.

The things being the way they are, compressed air is supplied from a compressor, not shown, via an air hose 108 to dispel some water and form a closed space S filled with compressed air in the head portion of the tubular liner bag 101. As the supply of the compressed air to the closed space S is continued, the closed space S expands, but it does not do so backward, because the water pressure it confronts at the water level formed between the air bags 102 and 103 is greater than the pressure required to force the tubular liner bag 101 to evert. Thus, as the supply of the compressed air is continued, the compressed air does not flow backward and up along the manhole, but causes the tubular liner bag 101 to start everting again prompted by the increased pressure in the closed space S, and thus the tubular liner bag 101 advances in the pipe 110 leftward, as seen in FIG. 5.

As described above, according to this method of everting, the closed space S is formed in the tubular liner bag 101 inserted in the pipe 110, and everting is effected by means of the pressure of the compressed air supplied to this closed space S, so that it is possible to reduce the size of the apparatus for eversion installed on the ground and eversion itself can be conducted with high operation efficiency and ease.

However, in this eversion method, when the air bags 102, 103 are inflated inside the tubular liner bag 101, as shown in FIG. 5, the air bag 102 is forced to float by the buoyancy caused by the water staying in the tubular liner bag 101, and as the result the air bag 102 can be torn apart from the tubular liner bag 101 where it is adhered to the bag 101, and consequently a burst may occur in the tubular liner bag 101.

Also, this eversion method requires that the air bags 102, 103 be attached to the tubular liner bag 101, so that the preparation of tubular liner bag 101 complete with the air bags is complicated and the manufacturing cost is increased.

The present invention was contrived in view of the above problems, and it is, therefore, a principal object of the invention to provide a new method for everting a tubular liner bag which ensures that the tubular liner bag can be manufactured at a low cost and can be everted effectively and easily with a compact everting apparatus.

SUMMARY OF THE INVENTION

In order to attain the above and other related objects of the invention, there is provided an improved method of providing a lining inside a pipe by everting a tubular liner bag inside the inner wall of a length of the pipe. This method includes the steps of: (a) preparing the tubular liner bag such that one end of an air hose connected to an air compressor is attached to the tubular liner bag at a suitable position at an outer surface of the tubular liner bag in an uneverted state thereof; (b) everting the tubular liner bag by supplying water under pressure into a vertical entrance to the pipe; (c) turning a head of the tubular liner bag toward a side of the pipe which is to be lined, when the head of the tubular liner bag enters the inner wall of the pipe; (d) everting the tubular liner bag substantially deep into the pipe; (e) stopping eversion of the tubular liner bag; (f) deforming the everted tubular liner bag a substantially J shape with the head portion of the tubular liner bag corresponding to a toe of the J-shape, so that when compressed air of a pressure not substantially greater than a pressure required to force the tubular liner bag to evert exists in the toe portion of the J-shaped tubular liner bag the air does not reach a long-leg section of the J-shaped tubular liner bag from the toe section; and (g) operating the air compressor to supply compressed air into the head portion of the tubular liner bag by way of the air hose, to thereby increase an internal pressure in the head portion of the tubular liner to a value substantially higher than a value required to force the tubular liner bag to evert.

In one aspect of the preferred embodiment, the step (f) consists of the substeps of: (i) laying an inflatable air bag adapted to inflate when supplied with compressed air in the pipe, (ii) supplying the air bag with compressed air to thereby inflate the air bag; and (iii) lowering a press means down in the vertical entrance to depress the everted tubular liner bag at a selected location, and wherein step (d) the tubular liner bag is everted until the everted head thereof reaches substantially beyond the air bag laid in the pipe.

In another embodiment, which is applicable only when the pipe has a small inner diameter in the range of 200 to 350 mm, and has a slope of 20° or greater, the step (c) comprises the head of the tubular liner bag being turned toward an upstream side of the pipe, and the step (f) consists of lowering a press means down in into the vertical entrance to depress the everted tubular liner bag at a selected location.

According to yet another embodiment of the invention, the air bag is not attached to the tubular liner bag, but is merely sandwiched between the inner wall of the pipe and the tubular liner bag, so that there will not occur a problem encountered with the conventional practice, i.e., that the air bag is torn apart from the tubular liner bag to cause the tubular liner bag to burst.

Also, unlike the conventional practice, there is no need for attaching the air bag to the tubular liner bag beforehand, so that it is possible to use the ordinary tubular bag as it is; therefore, the cost for the lining can be lower.

Furthermore, a closed space is formed as compressed air is supplied into the tubular liner bag which is substantially inserted in the pipe, and the further everting of the tubular liner bag in the pipe is effected by means of the high pressure of the compressed air supplied into the closed space, so that the apparatus for eversion installed on the ground can be small and compact, and it is possible to conduct the eversion with high operation efficiency and ease.

According to the second embodiment of the invention, no air bag is required unlike the first embodiment, so that it is possible to obtain the same effects with even lower cost.

Thus, the present invention attains the above-mentioned objects.

Further scope of applicability of the present invention will become apparent from the detailed description given hereinafter. However, it should be understood that the detailed description and specific examples, while indicating preferred embodiments of the invention are given by way of illustration only, since various changes and modifications within the spirit and scope of the invention will become apparent to those skilled in the art from this detailed description.

The present invention will become more precisely understood from the detailed description given hereinbelow and the accompanying drawings which are given by way of illustration only, and thus are not limitative of the present invention.

DETAILED DESCRIPTION OF THE PREFERRED EMBODIMENTS

Figure 1:
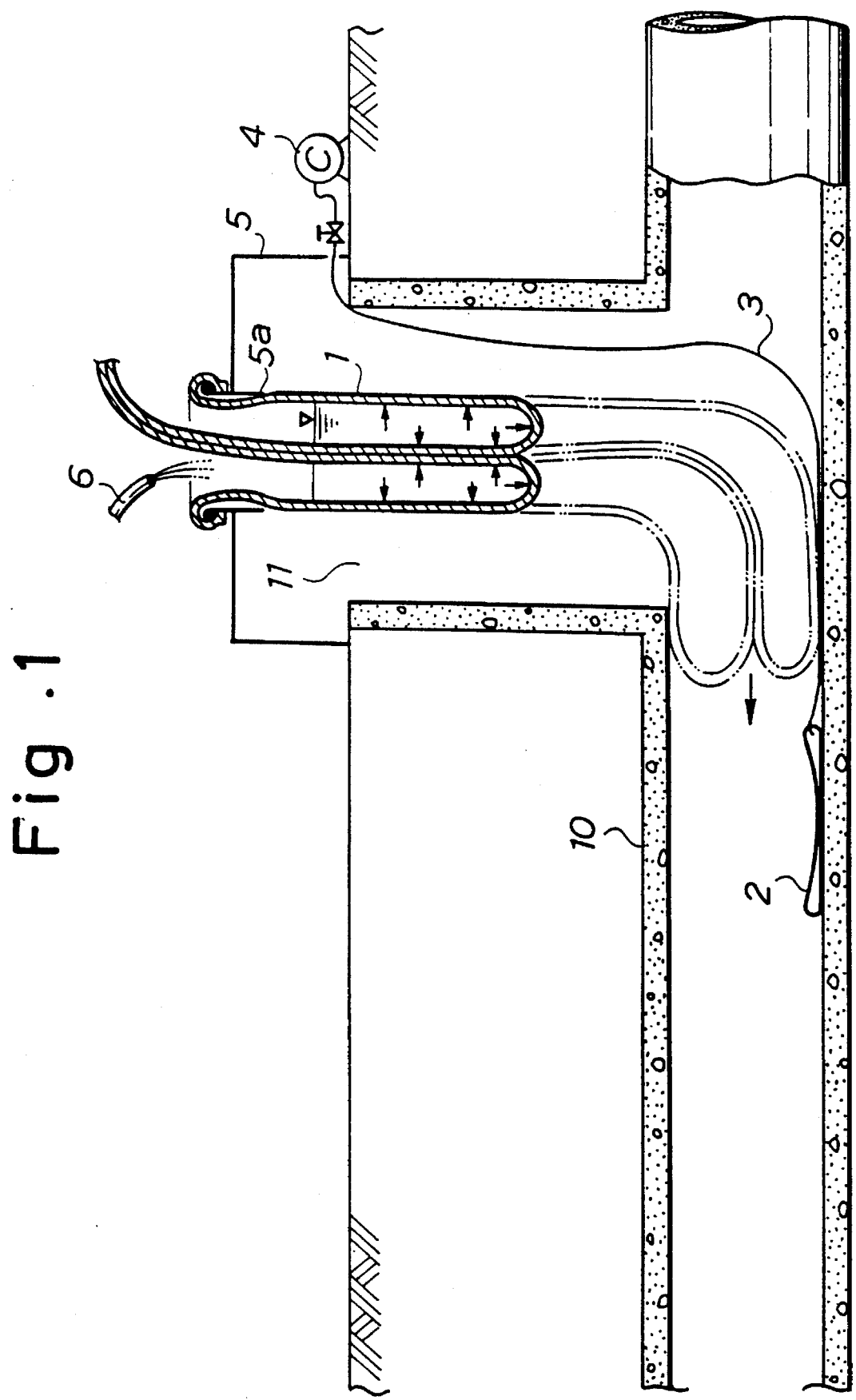
FIG. 1 is a sectional side view of a site of a pipe repair illustrating a step of a tubular liner bag everting method according to a first aspect of the invention.
Figure 2:
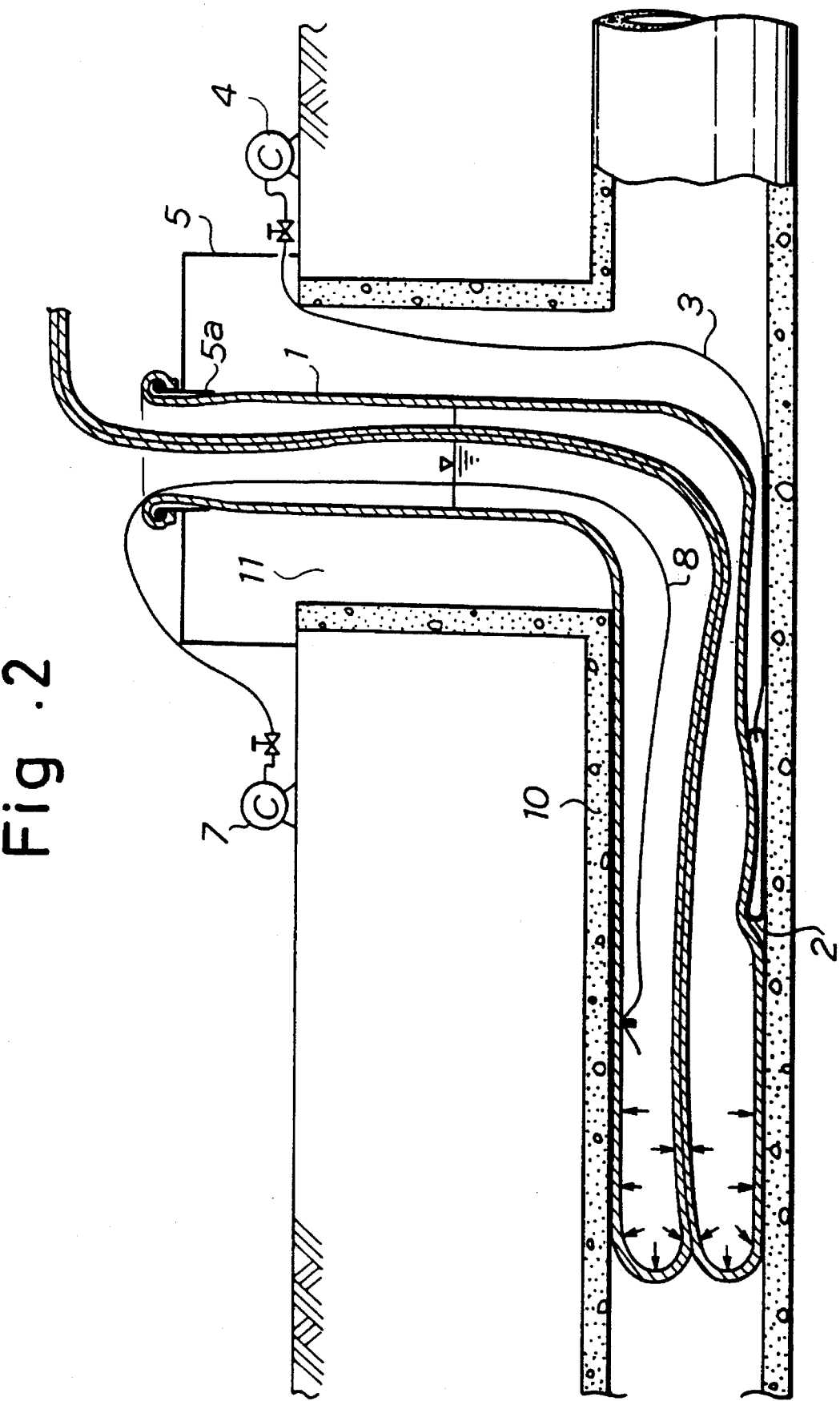
FIG. 2 is a sectional side view similar as FIG. 1 illustrating a further step of the tubular liner bag everting method according to the first aspect of the invention.
Figure 3:
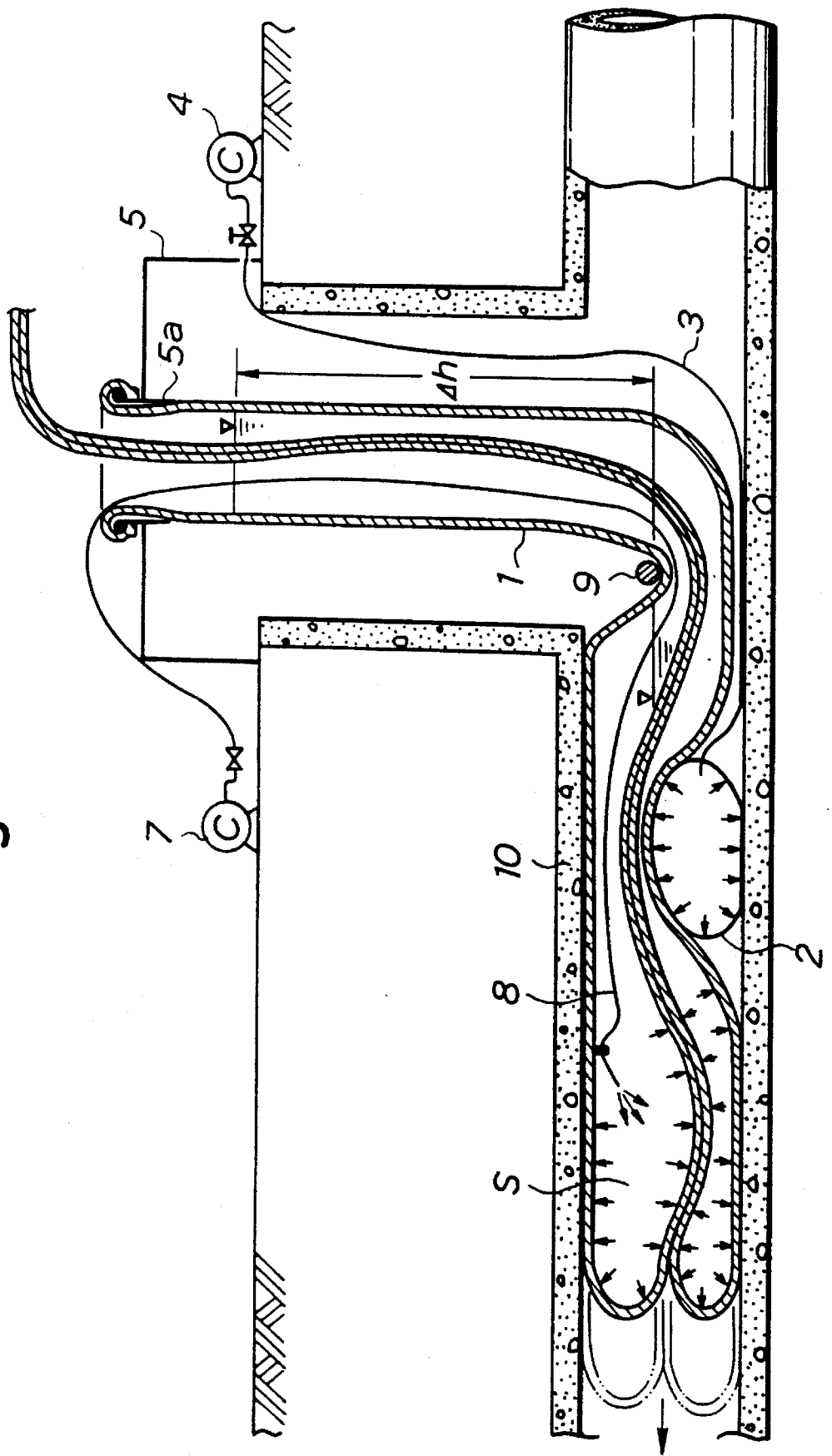
FIG. 3 is a sectional side view similar as FIG. 1 illustrating a further step of the tubular liner bag everting method according to the first aspect of the invention.

FIGS. 1 through 3 are sectional side views of a site in which a pipe is repaired, each illustrating a respective step of a tubular liner bag eversion of a first embodiment of the inventive method.

With reference to FIG. 1, this first embodiment of the inventive method, wherein a tubular liner bag 1 soaked with thermosetting resin is inserted by eversion into a pipe 10, requires a closed air bag 2 (hereinafter merely "air bag 2") to be placed in the pipe 10 at a location which is a predetermined distance away from a manhole 11, from which the pipe 10 is lined. Incidentally, this air bag 2, which is at the moment empty and flat, is inflatable and deflatable, and is a plastic bag made of a material such as polyvinylchloride, urethane, ethylvinyl acetate, etc. The air bag 2 is connected via an air hose 3 to a compressor 4 installed on the ground.

Meanwhile, one end of a tubular liner bag 1 is anchored on a tubular brim 5a of a support frame 5, as shown in FIG. 1, and turned inside the brim 5a a little; then, into the small pocket caused by this turning, water is charged from a water hose 6.

Thereupon, the water pressure causes the tubular liner bag 1 to evert and enter into the manhole 11. As the tubular liner bag 1 is everted further and hits upon the inner wall of the pipe 10, the head of the tubular liner bag 1 is turned toward that side of the pipe 10 which is to be lined, and the tubular liner bag 1 is everted farther to enter into the pipe 10, as shown in broken line in FIG. 1. (This turning of the tubular liner bag 1 into the pipe 10 may be carried out by any of conventional procedures, such as one wherein a pull rope with a hook means tied halfway to it is passed in the pipe 10 beforehand such that the eversion head of the tubular liner bag 1 lands on the rope at a location downstream to the hook means, and the pull rope is pulled downstream so as to force the eversion head to turn.) Now, the tubular liner bag 1 is everted deeper into the pipe 10 (leftward, as seen in FIG. 1), and runs over the deflated air bag 2, which has been already positioned in the pipe 10, as shown in FIG. 2. Incidentally, one end of an air hose 8, whose other end is connected to a compressor 7 installed on the ground, is attached to the outer surface (before everting) of the tubular liner bag 1. As the tubular liner bag 1 is everted, as best seen in FIG. 2, the air hose 8 is drawn into the tubular liner bag 1 so that its attached end opens in the everted part of the tubular liner bag 1.

When the tubular liner bag 1 has run over the air bag 2, as described above, and the eversion proceeds substantially deep into the pipe 10, the supply of water is stopped and the tubular liner bag 1 stops everting. The compressor 4 is driven to supply compressed air to the air bag 2 via the air hose 3, and the air bag 2 is inflated, as shown in FIG. 3. At the same time as this, a cylindrical bar 9, which is held in such a manner that it stands vertical to the sheet of FIG. 3, is lowered in the manhole 11 and pressed on a portion of the tubular liner bag 1. As a result, the tubular liner bag 1 is forced to undulate to describe a locus in a shape of a fallen letter "S" within the pipe 10. Then the supply of water is ceased, and the eversion stops.

The things being the way they are, the compressor 7 is driven to supply compressed air to the tubular liner bag 1 via the air hose 8; then the supplied compressed air pushes away some water and forms a closed space S filled with the compressed air in the head portion of the tubular liner bag 1. Incidentally, at this moment, the water inside the tubular liner bag 1 has two levels one higher than the other by $\Delta h$, which is equal to $P/\gamma$, $\gamma$ being the specific gravity of water, and P being the internal pressure of the closed space S. As the supply of the compressed air to the closed space S is continued, the closed space S expands, but it does not do so backward, because the water pressure it confronts at the lower water level is greater than the pressure required to force the tubular liner bag 1 to evert. Thus, as the supply of the compressed air is continued, the compressed air does not flow backward and up along the manhole 11, but causes the tubular liner bag 1 to evert farther prompted by the increased pressure in the closed space S; thus the tubular liner bag 1 advances leftward in the pipe 10, as shown in broken line in FIG. 3.

As described above, in this embodiment, the air bag 2 is not attached to the tubular liner bag 1, and is merely sandwiched between the inner wall of the pipe 10 and the tubular liner bag 1, so that there will not occur the problem with the conventional practice that the air bag 2 is torn apart from the tubular liner bag 1 to cause the tubular liner bag 1 to burst.

Also, unlike the conventional practice, there is no need for attaching the air bag 2 to the tubular liner bag 1 beforehand, so that it is possible to use the ordinary tubular bag as it is; therefore, the cost for the lining can be lower.

Furthermore, the closed space S is formed as compressed air is supplied into the tubular liner bag 1 which is partially inserted in the pipe 10, and the further everting of the tubular liner bag 1 in the pipe 10 is effected by means of the high pressure of the compressed air supplied into the closed space S, so that the apparatus for eversion installed on the ground can be small and compact, and it is possible to conduct the eversion with high operation efficiency and ease.

Next, with reference to FIG. 4, the second embodiment of the inventive method will be described. Incidentally, FIG. 4 is a sectional side view of a site of a pipe repair useful to explain the eversion procedure of the second embodiment, and in FIG. 4 the same reference numerals are used for elements which have corresponding elements in FIGS. 1 through 3.

Figure 4:
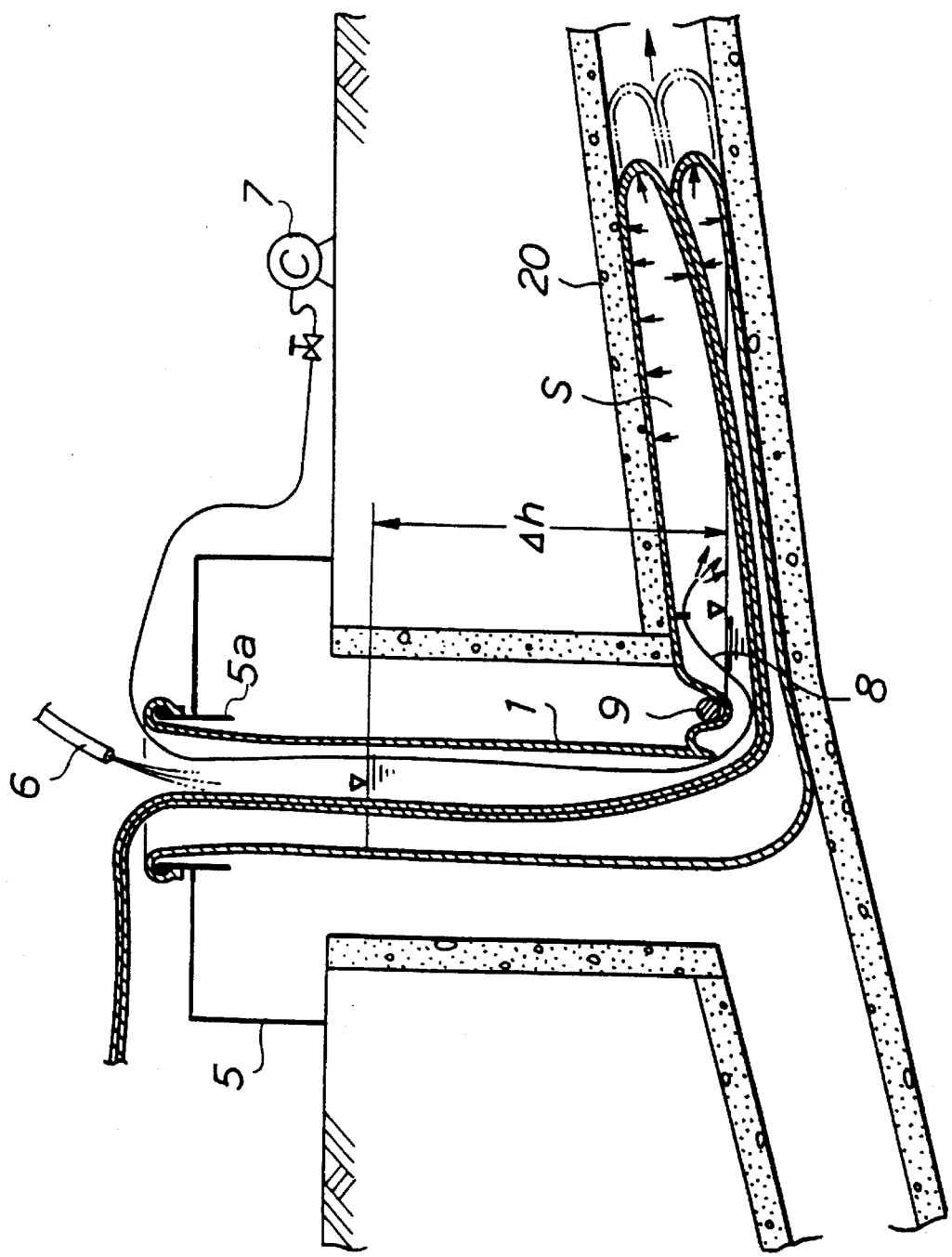
FIG. 4 is a sectional side view of a site of a pipe repair illustrating a step of a tubular liner bag everting method according to a second aspect of the invention.
Figure 5:
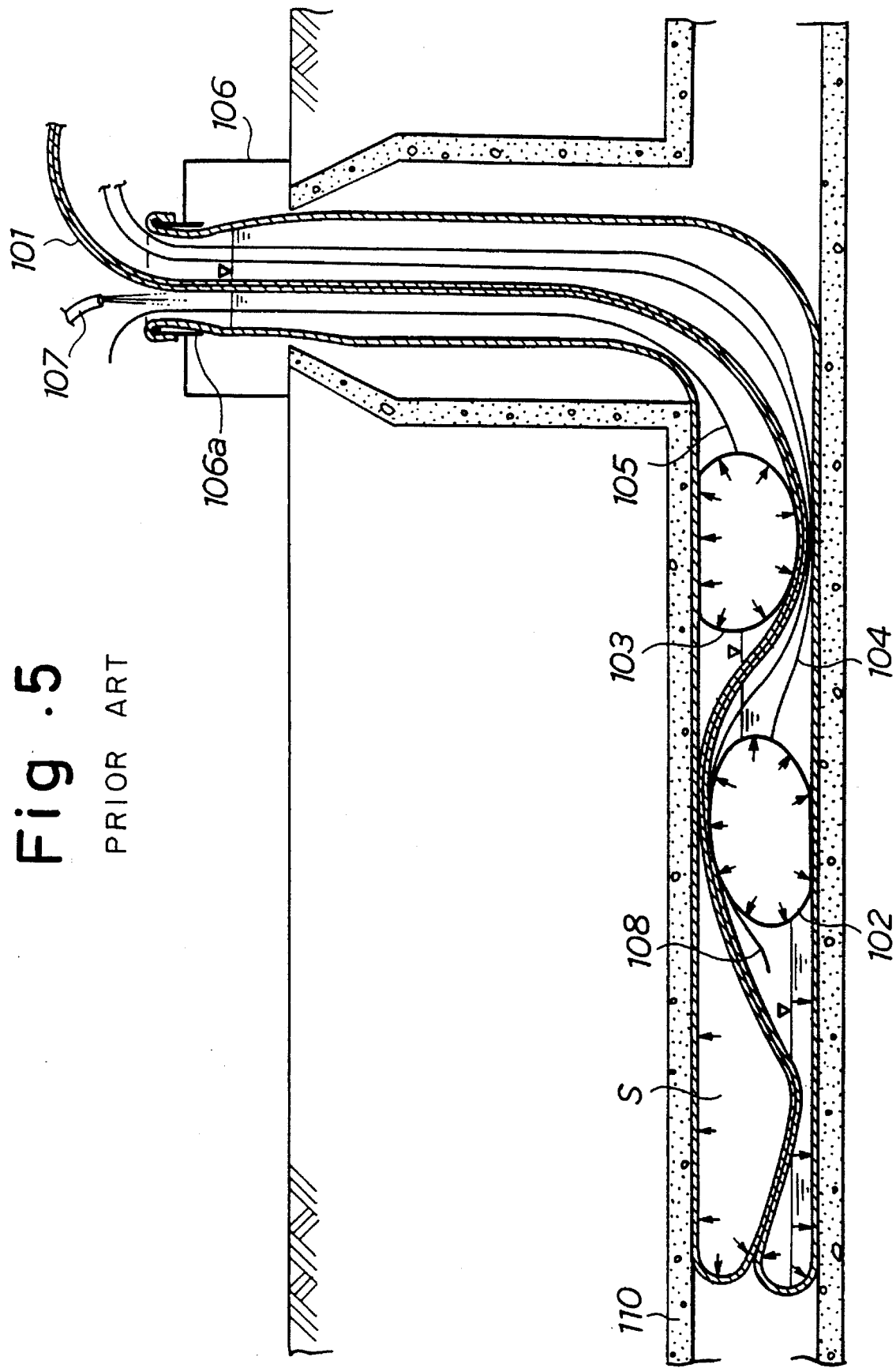
FIG. 5 is a sectional side view of a site of a pipe repair illustrating the procedure of a conventional tubular liner bag everting method.

This second embodiment is applied to cases wherein the pipe 20 to be lined with the tubular liner bag 1 by eversion has a small inner diameter in the range of about 200 to 350 mm, and has a slope of 20 or greater, as shown in FIG. 4. According to the eversion procedure of this embodiment, the air bag 2 of the first embodiment can be dispensed with.

With reference to FIG. 4, one end of the tubular liner bag 1 is anchored on a tubular brim 5a of a support frame 5, as shown in FIG. 4, and turned inside the brim 5a a little; then, into the small pocket caused by this .turning, water is charged from a water hose 6.

Thereupon, the water pressure causes the tubular liner bag 1 to evert and enter into the manhole. As the tubular liner bag 1 is everted further and hits upon the bottom wall of the sloped pipe 20, it is turned to enter into the upstream side of the pipe 20, i.e., rightward, as seen in FIG. 4. Then, the tubular liner bag 1 is everted farther into the pipe 20 until the head of the tubular liner bag 1 is substantially inserted in the sloped pipe 20. Now, the supply of water is stopped, and the tubular liner bag 1 stops everting. Incidentally, one end of an air hose 8, whose other end is connected to a compressor 7 installed on the ground, is attached to the outer surface (before everting) of the tubular liner bag 1, and as the tubular liner bag 1 is everted, as shown in FIG. 4, the air hose 8 is drawn into the tubular liner bag 1 so that its attached end opens in the everted part of the tubular liner bag 1.

Then, a cylindrical bar 9, which is held in such a manner that it stands vertical to the sheet of FIG. 4, is lowered in the manhole and pressed on a portion of the tubular liner bag 1; as a result, the tubular liner bag 1 is depressed at the portion where it is pressed. Incidentally, there are cases where it is not necessary to depress the tubular liner bag 1 with the bar 9.

The things being the way they are, the compressor 7 is driven to supply compressed air to the tubular liner bag 1 via the air hose 8; then the supplied compressed air pushes away some water and forms a closed space S in the head portion of the everted tubular liner bag 1. Incidentally, at this moment, the water inside the tubular liner bag 1 has two levels one higher than the other by $\Delta h$, which is equal to $P/\gamma$, $\gamma$ being the specific gravity of water, and P being the internal pressure of the closed space S. As the supply of the compressed air to the closed space S is continued, the closed space S expands, but it does not do so backward, because the water pressure it confronts at the lower water level is greater than the pressure required to force the tubular liner bag 1 to evert. Thus, as the supply of the compressed air is continued, the compressed air does not flow backward and up along the manhole, but causes the tubular liner bag 1 to evert farther prompted by the increased pressure in the closed space S; thus the tubular liner bag 1 advances upstream in the pipe 20, as shown in broken line in FIG. 4.

As described above, in this embodiment, no air bag is required unlike the first embodiment, so that it is possible to obtain the same effects with lower cost.

As is clear from the above explanation, in the present invention, no air bag is attached to the tubular liner bag, so that no complication can take place involving an air bag.

Also, there is no need of attaching the air bag to the tubular liner bag beforehand, so that it is possible to use the ordinary tubular bag as it is; therefore, the cost for the lining can be lower.

Furthermore, the closed space S is formed as compressed air is supplied into the tubular liner bag, and the everting of the tubular liner bag is effected by means of the high pressure of the compressed air supplied into the closed space S, so that the apparatus for eversion installed on the ground can be small and compact, and it is possible to conduct the eversion with high operation efficiency and ease.

While the invention has been described in its preferred embodiments, it is to be understood that modifications will occur to those skilled in the art without departing from the spirit of the invention. For instance, the thermosetting resin may be replaced by another hardenable resin such as photosetting resin. The scope of the invention is therefore to be determined solely by the appended claims.

What is claimed is:

1. A method of providing a lining inside a pipe by everting a tubular liner bag inside a length of the inner wall of the pipe, comprising the steps of:

(a) preparing the tubular liner bag such that one end of an air hose connected to an air compressor is attached to a suitable position at an outer surface of the liner bag in an uneverted state thereof;

(b) everting the tubular liner bag by supplying water under pressure into a vertical entrance to the pipe;

(c) turning a head of the tubular liner bag toward a side of the pipe which is to be lined, when the head of the tubular liner bag hits upon the inner wall of the pipe;

(d) everting the tubular liner bag substantially deep into the pipe;

(e) stopping eversion of the tubular liner bag;

(f) deforming the everted tubular liner bag to a substantially J-shape with the head portion of the tubular liner bag corresponding to a toe portion of the J-shape so that when compressed air at a pressure not substantially higher than a pressure required to force the tubular liner bag to evert exists in the toe portion of the J-shaped tubular liner bag the air does not reach a long-leg section of the J-shaped tubular liner bag from said toe section; and (g) operating said air compressor to supply compressed air into the head portion of the tubular liner bag via said air hose, to thereby increase an internal pressure in the head portion of the tubular liner to a value substantially higher than a value required to force the tubular liner bag to evert, wherein said pipe has an inner diameter in the range of 200 to 350 mm, and has a slope of 20° or greater, said step (c) comprises the step of turning the head of the tubular liner bag toward an upstream side of the pipe, and said step (f) consists of lowering a press means into said vertical entrance to depress the everted tubular liner bag at a selected location.

2. A method of providing a lining inside a pipe by everting a tubular liner bag inside a length of the inner wall of the pipe, comprising the steps of:

(a) preparing the tubular liner bag such that an air hose connected to an air compressor is attached to a suitable position at an outer surface of the liner bag in an uneverted state thereof, and laying an inflatable air bag adapted to inflate when supplied with compressed air at a location in a side of the pipe which is to be lined;

(b) everting the tubular liner bag by supplying water under pressure into a vertical entrance to the pipe;

(c) turning ahead of the tubular liner bag toward said side of the pipe to be lined, when the head of the tubular liner bag hits upon the inner wall of the pipe;

(d) everting the tubular liner bag into the pipe until the everted head thereof reaches substantially beyond said air bag laid in the pipe;

(e) stopping evasion of the tubular liner bag; (this step may be deleted as well for redundancy, though it is harmless to stay);

(f) deforming the everted tubular liner bag to a substantially J-shape with the head portion of the tubular liner bag corresponding to a toe portion of the J-shape by (i) supplying said air bag with compressed air to thereby inflate the air bag, and (ii) lowering a press means down in said vertical entrance to depress the everted tubular liner bag at a selected location, so that when compressed air of a pressure not substantially higher than a pressure required to force the tubular liner bag to evert exists in the toe portion of the J-shaped tubular liner bag the air does not reach a long-leg portion of the J-shaped tubular liner bag from said toe portion; and (g) operating said air compressor to supply compressed air into the head portion of the tubular liner bag via said air hose, to thereby increase an internal pressure in the head portion of the tubular liner to a value substantially higher than a value required to force the tubular liner bag to evert.

* * * * *